United States Patent
Martz et al.

(10) Patent No.: US 7,174,614 B2
(45) Date of Patent: Feb. 13, 2007

(54) DEVICE FOR FACILITATING CONNECTION OF TERMINAL ENDS OF VEHICLE TRACK TO FORM CLOSED LOOP

(76) Inventors: Dwayne A. Martz, 13907 W. 71st Pl., Shawnee, KS (US) 66219; Todd A. Betleiewski, 15716 Howe, Overland Park, KS (US) 66224; Jeffrey H. Turner, Jr., 5548 Monrovia, Shawnee, KS (US) 66216; Michael R. Bourquin, 4835 Quivera Rd., Shawnee, KS (US) 66216

( * ) Notice: Subject to any disclaimer, the term of this patent is extended or adjusted under 35 U.S.C. 154(b) by 211 days.

(21) Appl. No.: 10/858,546

(22) Filed: Jun. 1, 2004

(65) Prior Publication Data

US 2005/0262679 A1 Dec. 1, 2005

(51) Int. Cl.
*B23P 19/04* (2006.01)
(52) U.S. Cl. .......................... 29/257; 269/43
(58) Field of Classification Search ................. 269/43, 269/282, 283, 276; 29/281.1
See application file for complete search history.

(56) References Cited

U.S. PATENT DOCUMENTS

| | | | | |
|---|---|---|---|---|
| 4,341,375 A | * | 7/1982 | Romanin | 269/43 |
| 6,196,536 B1 | * | 3/2001 | Hintze | 269/282 |
| 7,017,253 B1 | * | 3/2006 | Riggle | 29/468 |
| 2002/0101017 A1 | * | 8/2002 | Kolarik | 269/43 |
| 2005/0262679 A1 | * | 12/2005 | Martz et al. | 29/257 |
| 2005/0262680 A1 | * | 12/2005 | Martz et al. | 29/257 |

* cited by examiner

*Primary Examiner*—Lee D. Wilson
(74) *Attorney, Agent, or Firm*—Spencer Fane Britt & Browne LLP

(57) ABSTRACT

A device for engaging first and second terminal ends of a vehicle track and drawing the terminal ends together in order to facilitate their connection to form a closed loop of track. The device comprises first and second coupling ends for engaging respective terminal ends of the track; a terminal guide plate; and two guide rods and a threaded drive rod extending between the first coupling end and the terminal guide plate and passing through the second coupling end. Fittings are provided at both ends of the drive rod. Turning either or both of the fittings causes the drive rod to turn, which causes the second coupling end to move toward the first, thereby drawing the first and second terminal ends together. In alternative embodiments, this screw-type drive mechanism is replaced by ratchet-type and hydraulic/pneumatic-type drive mechanisms.

17 Claims, 4 Drawing Sheets

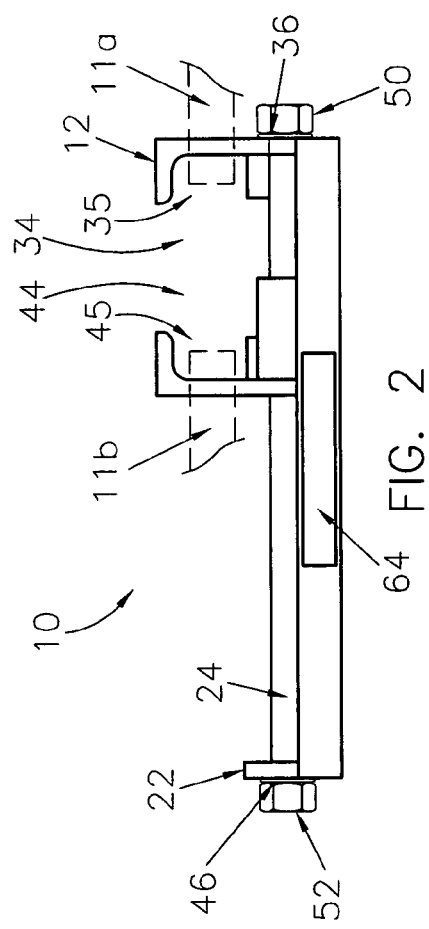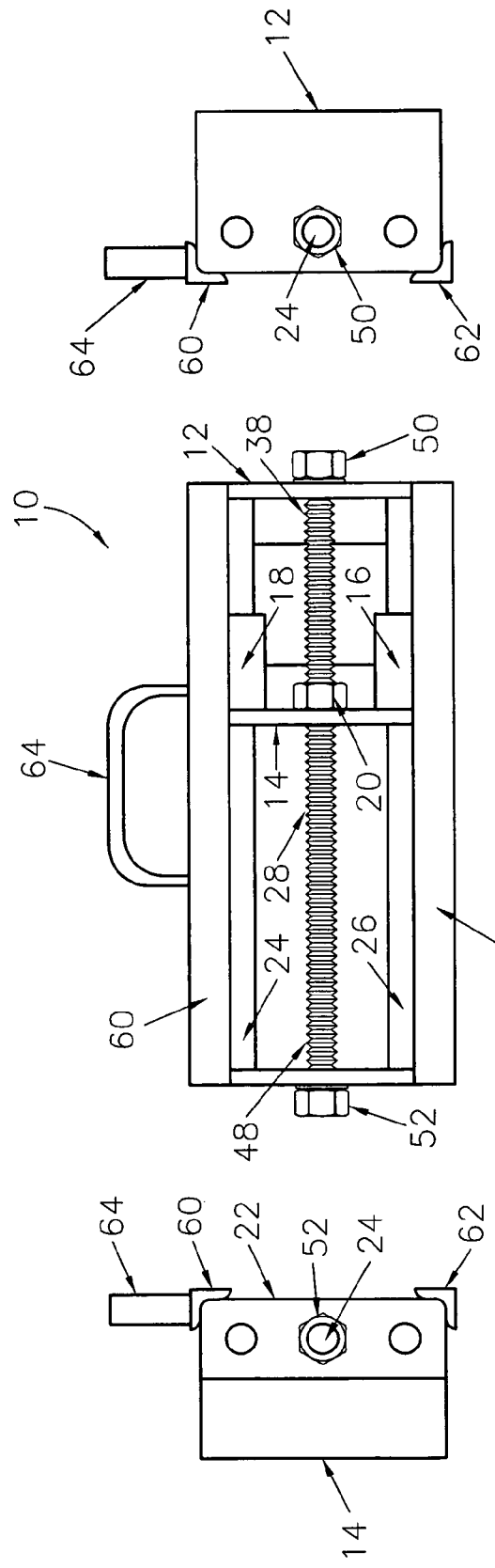

DEVICE FOR FACILITATING CONNECTION OF TERMINAL ENDS OF VEHICLE TRACK TO FORM CLOSED LOOP

BACKGROUND OF THE INVENTION

1. Field of the Invention

The present invention relates broadly to tools and other mechanisms for drawing together the terminal ends of a vehicle track so as to facilitate their connection. More particularly, the present invention concerns a device for engaging each terminal end of a vehicle track and drawing the terminal ends together in order to facilitate their connection and thereby form a closed or continuous loop of track.

2. Description of the Prior Art

It will be appreciated that tracked vehicles are used in a variety of industries and endeavors, including, for example, light and heavy construction industries and military applications. Furthermore, it is known to convert certain types of wheeled vehicles to tracked vehicles in order to improve traction in, e.g., snow, mud, and similar conditions. The vehicle track typically comprises a number of track shoes flexibly connected in series by track pins, bolts, clips, or other conventional connection mechanisms to form a linear length of track having first and second terminal ends. This length of track is entrained about drive and support structures and the terminal ends are connected to form a closed, continuous, or "endless" loop of track. Typically, the actual connection of terminal ends is accomplished with the same type of conventional connection mechanism used to connect all other adjacent track shoes together.

In the prior art, the process of connecting the terminal ends is facilitated by use of various mechanisms to draw the terminal ends together. One such mechanism, for example, involves a strap having first and second ends. The first end is secured to one of the terminal ends, the second end is secured to the other terminal end, and the strap is tightened to draw the terminal ends together. Unfortunately, the strap mechanism suffers from a number of problems and disadvantages, including, for example, that it neither provides nor easily allows for mechanical assistance or enhancement to the user's own strength, making it unsuitable for use tracks that are too large or heavy to pull together by hand. Furthermore, the strap mechanism does not allow for a high degree of control when drawing the terminal ends together, and, as a result, the terminal ends may be misaligned, making inserting the track pin or bolt or fitting the clip to achieve the actual connection more difficult. Often, a hammer is used to force the connection mechanism into or onto the misaligned terminal ends, but this risks damaging the connection mechanism or the terminal ends themselves. Additionally, the strap mechanism can require a substantial amount of time to position, engage, and tighten, making it inconvenient and inefficient to use.

Another mechanism, called a "track jack", is used by the U.S. military for its tracked vehicles. The track jack comprises first and second curved jaws oppositely threaded and opposingly oriented on a threaded rod have a hexagonal portion at its center. Two such track jacks, one being positioned on each side of the terminal ends, are needed to facilitate the connection. In use, the threaded rod of each track jack is turned so as to locate the curved jaws at opposite extreme ends of the threaded rod. Each track jack is then positioned such that its first curved jaw engages one of the terminal ends and its second curved jaw engages the other terminal end. The hexagonal center portion of each track jack is then turned with a wrench to draw the jaws and the terminal ends together. The track jacks must be tightened substantially simultaneously and with great care in order to avoid misaligning the terminal ends. According to one commentator, "if the angle between the two track blocks is not within a very few degrees of correct, you will not get the track pin out without using cutting equipment or explosives". Thus, the track jack mechanism also suffers from a number of problems and disadvantages, including, the inconvenience of having to use two track jacks in order to properly draw the terminal ends together. If the track jacks are not tightened substantially simultaneously and with great care, the terminal ends may become misaligned and difficult or impossible to connect. Also, as soon as one of the track jacks is tightened, tension is reduced on the other track jack such that its jaws threaten to become disengaged from one or both of the terminal ends. Additionally, because the hexagonal portion is located in the center of the threaded rod, between the curved jaws, it must be turned using a wrench from a 90° angle, and it cannot be turned using a socket or similar time-saving mechanism or from a non-90° angle. Typically, because of the relatively tight space in which this process takes place, a single person tightens both track jacks. This requires that one of the track jacks be tightened by a relatively small amount, then the wrench must be moved to the other track jack and it must be tightened by the same or a slightly greater amount, and so on, alternating between the tracks jacks until the terminal ends are brought together and the connection mechanism can be installed. Thus, the track jack mechanism can also require a substantial amount of time to position, engage, and tighten, making it inconvenient and inefficient to use.

Due to the above-identified and other problems and disadvantages in the prior art, a need exists for an improved device for facilitating the connection of terminal ends of a vehicle track.

SUMMARY OF THE INVENTION

The present invention overcomes the above-described and other problems and disadvantages in the prior art by providing an improved device for more quickly and efficiently drawing the terminal ends of a vehicle track together in order to facilitate their connection to form a closed or continuous loop of track. In a preferred first embodiment, the device broadly comprises a first coupling end; a second coupling end with parallel first and second guide sleeves and a substantially centered internally-threaded receiver; a terminal guide plate; parallel first and second guide rods; and an externally-threaded drive rod.

The first coupling end presents a first engagement face and channel for receiving or otherwise engaging the first terminal end of the track, and presents a first substantially centered through-hole to allow a first end of the drive rod to pass freely therethrough. Similarly, the second coupling end presents a second engagement face and channel for receiving or otherwise engaging the second terminal end of the track. The internally-threaded receiver is substantially centered on an upper portion of the second engagement face above the channel, and the first and second guide sleeves are positioned to either side of the receiver and oriented parallel to it and to one another. The terminal guide plate provides a second substantially centered through-hole to allow a second end of the drive rod to pass freely therethrough.

The first and second guide rods present first and second ends, with the first ends being welded to the first engagement face to either side of the first through-hole, an intermediate portion of the rods passing parallely and slidably through the first and second guide sleeves, and the second ends being welded to either side of the second through-hole.

The externally-threaded drive rod presents first and second ends with the first end passing freely and movably through the first through-hole, an intermediate portion of the drive rod passing engagingly through the internally-threaded receiver, and the second end passing freely and movably through the second through-hole. Thus, the drive rod and guide rods extend parallely between the first coupling end and the terminal guide plate, with the drive rod being substantially centered between the guide rods. The first and second ends of the drive rod are provided with fittings to facilitate turning the drive rod. Turning the drive rod in an appropriate direction causes the second coupling end to move toward the first coupling end, thereby drawing the terminal ends of the track evenly and smoothly closer together until such a point as they may be connected.

The screw-type drive mechanism, comprising the internally-threaded receiver and the externally threaded drive rod, of the preferred first embodiment is replaced in a preferred second embodiment by a ratchet-type drive mechanism, and is replaced in a preferred third embodiment by a hydraulic/pneumatic-type drive mechanism.

Thus, it will be appreciated that the device of the present invention provides a number of substantial advantages over the prior art, including, for example, advantageously allowing for quickly and efficiently drawing the terminal ends of the track together evenly and smoothly, thereby further facilitating connection. More specifically, in contrast to the prior art strap mechanism, the device of the present invention allows for achieving substantial mechanical assistance or enhancement to the user's own strength, thereby making it suitable for use with larger or heavier tracks; allows for a greater degree of control, which is particularly important to arriving at the closest alignment possible, thereby making the connection substantially easier; and can be positioned, engaged, and tightened more quickly and efficiently.

In contrast to the prior art track jack used by the military, the device of the present invention eliminates the impracticality of using two separate track jacks and substantially simultaneously tightening them; allows for drawing the terminal ends of the track together evenly and smoothly without one of the track jacks becoming disengaged during the process due to a lack of tension when the other track jack is tightened; allows for turning the threaded rod conveniently from either end of the device and from convenient angles other than 90°; and can be positioned, engaged, and tightened more quickly and efficiently.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein:

FIG. 2 is a plan view of the device of FIG. 1, with first and second terminal ends of a vehicle track shown in broken line;

FIG. 3 is a front elevation view of the device of FIG. 1;

FIG. 4 is a left side elevation view of the device of FIG. 1;

FIG. 5 is a right side elevation view of the device of FIG. 1;

DETAILED DESCRIPTION OF A PREFERRED EMBODIMENT

Figure 1:
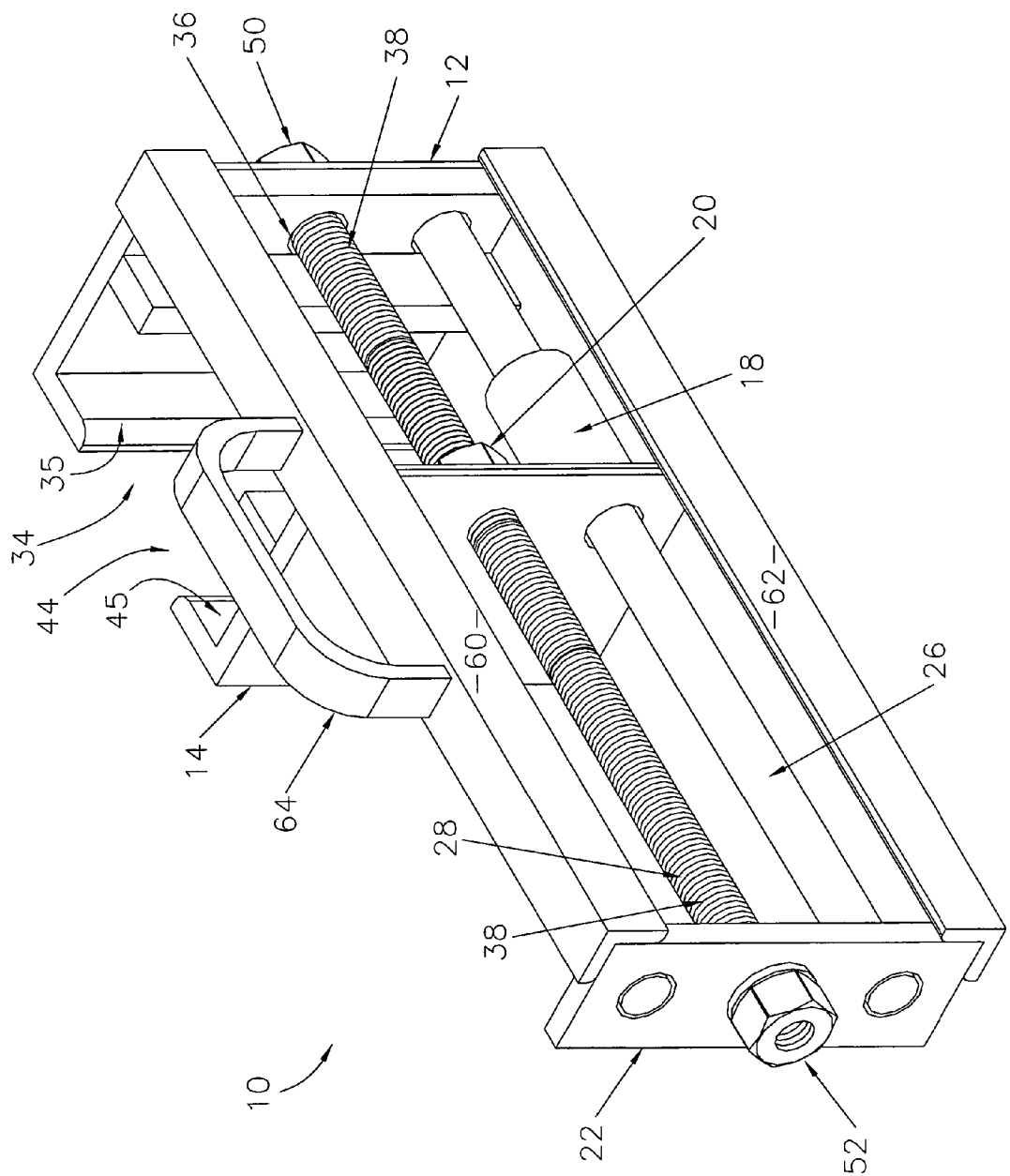
FIG. 1 is an isometric view of a preferred first embodiment of the device of the present invention using a screw-type drive mechanism.

With reference to the figures, a device 10 is herein described, shown, and otherwise disclosed in accordance with preferred first, second, and third embodiments of the present invention. Generally, the device 10 facilitates engaging first and second terminal ends 11a,11b of a vehicle track and drawing the terminal ends 11a,11b together in order to facilitate their connection to form a closed or continuous loop of track.

In the preferred first embodiment, shown in FIGS. 1–5, the device 10 broadly comprises a first coupling end 12; a second coupling end 14 with parallel first and second guide sleeves 16,18 and a substantially centered internally-threaded receiver 20; a terminal guide plate 22; parallel first and second guide rods 24,26; and an externally-threaded drive rod 28. The first coupling end 12 presents a first engagement face 34 for receiving or otherwise engaging the first terminal end 11a of the track. A first substantially centered through-hole 36 is provided and located on an upper portion of the first engagement face 34 to allow a first end 38 of the drive rod 28 to pass freely through the first coupling end 12. The first engagement face 34 is preferably substantially flat and wide and presents a defined first channel 35 so as to more securely or otherwise better receive or engage the first terminal end 11a.

The second coupling end 14 presents a second engagement 44 face for receiving or otherwise engaging the second terminal end 11b of the track. Like the first engagement face 34, the second engagement face 44 is preferably substantially flat and wide and presents a defined second channel 45 so as to more securely or otherwise better receive or engage the second terminal end 11b. The first and second coupling ends 12,14 are oriented opposingly. The internally-threaded receiver 20 is substantially centered on an upper portion of the second engagement face 44 above the second channel 45, and the first and second guide sleeves 16,18 are positioned to either side of the receiver 20 and oriented parallel to it and to one another.

The terminal guide plate 22 provides a second substantially centered through-hole 46 to allow a second end 48 of the drive rod 28 to pass freely through the terminal guide plate 22.

The first and second guide rods 24,26 present first and second ends, with the first ends of the guide rods 24,26 being welded or otherwise secured to the first engagement face 34 to either side of the first through-hole 36 of the first coupling end 12, an intermediate portion of the guide rods 24,26 passing parallely and slidably through the first and second guide sleeves 16,18 of the second coupling 14, and the second ends of the guide rods 24,26 being welded or otherwise secured to either side of the second through-hole 46 of the terminal guide plate 22.

The externally-threaded drive rod 28 presents first and second ends 38,48 with the first end 38 of the drive rod 28 passing freely and movably through the first through-hole 36 of the first coupling end 34, an intermediate portion of the drive rod 28 passing engagingly through the internally-threaded receiver 20 of the second coupling end 14, and the second end 48 of the drive rod 28 passing freely and movably through the second through-hole 46 of the terminal guide plate 22. Thus, the drive rod 28 and guide rods 24,26 extend parallely between the first coupling end 12 and the terminal guide plate 22, with the drive rod 28 being located between the guide rods 24,26.

The first and second ends 38,48 of the drive rod 28 are provided with fittings 50,52 to facilitate turning the drive rod 28 during use. The fittings 50,52 are preferably square, hex, or 8-point fittings, but may alternatively be any type of fitting adapted for cooperating with a wrench, handle, socket, or other tool or device for turning the fitting. Furthermore, one or both of the fittings 50,52 may include a knuckle that allows for orienting the tool or device at any convenient or otherwise desirable angle when turning the fitting.

As shown in the FIGs., it is also contemplated that the device 10 may include first and second rails 60,62 and a handle 64. The first and second rails 60,62 may be constructed of an L-shaped material and present first and second rail ends, with the first rail ends of each rail 60,62 being secured (as by, e.g., welding) to a corner or similar portion of the first coupling end 12, and the second rail ends being secured to a corner or similar portion of the terminal guide plate 22. The second coupling end 14 moves slidably within the channel defined by the two L-shaped rails 60,62, thereby assisting the guide rods 24,26 in maintaining an overall alignment of the other components of the device 10. The handle 64 may be fixedly secured (as by, e.g., welding) to a suitable component of the device 10, such as, for example, the first or second rail 60,62, to facilitate carrying the device 10.

In exemplary use and operation, the first coupling end 12 is fitted to or otherwise coupled with the first terminal end 11*a* of the track, and the second coupling end 14 is fitted to or otherwise coupled with the second terminal end 11*b* of the track. An appropriate tool (e.g., wrench, handle, socket) or other device is then used to turn either or both hex fittings 50,52, thereby turning the drive rod 28. The drive rod 28 turns freely within the first and second through-holes 36,46, but actively engages the internally-threaded receiver 20. When the drive rod 28 is turned in the appropriate direction, the second coupling end 14 is caused to move closer to the first coupling end 12, thereby drawing the terminal ends 11*a*,11*b* of the track closer together. When the terminal ends 11*a*,11*b* are sufficiently close, they can be connected using a conventional connection mechanism (e.g., a track pin, bolt, clip).

Figure 6:
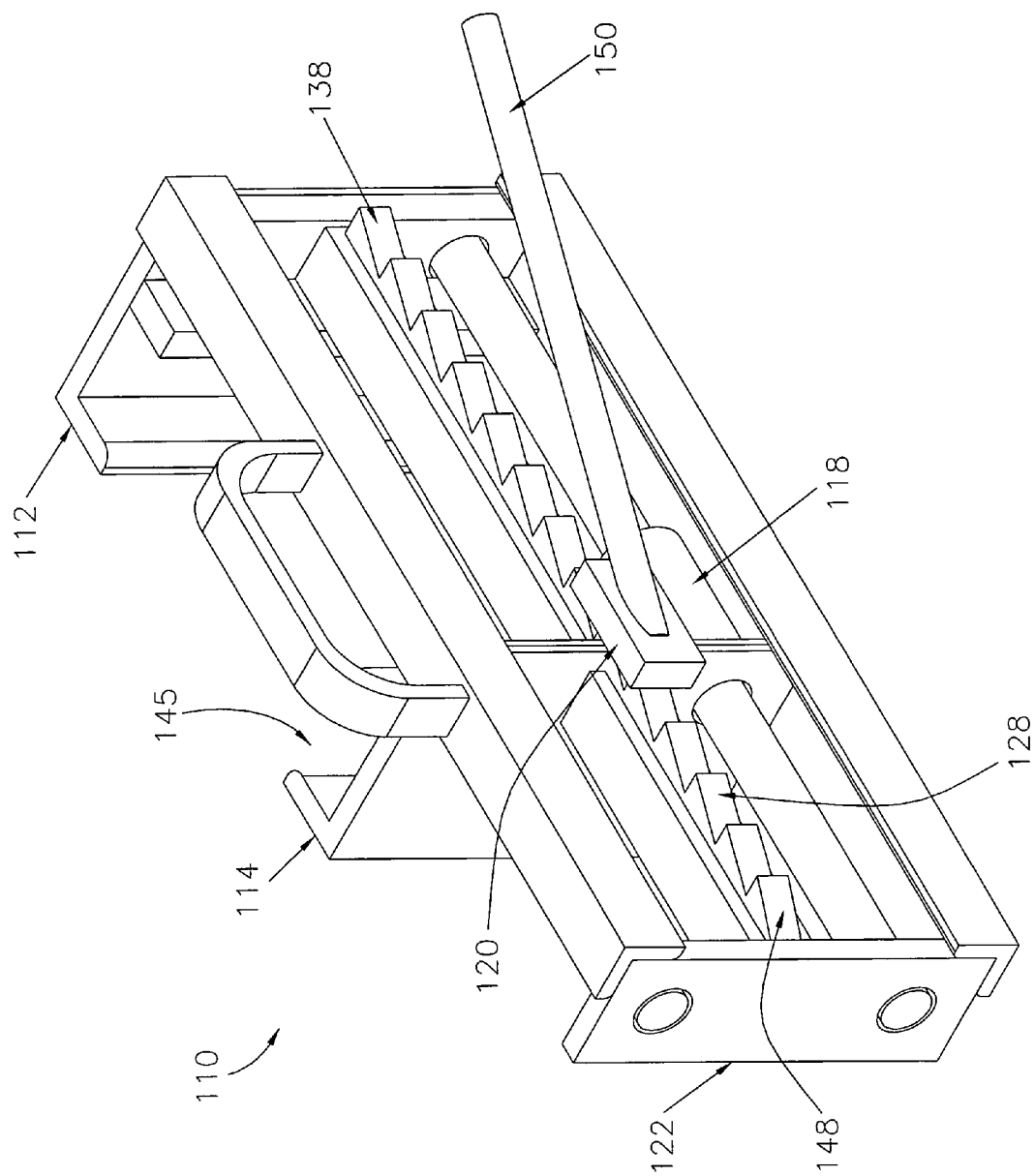
FIG. 6 is an isometric view of a preferred second embodiment of the device of the present invention using a ratchet-type drive mechanism.

Referring also to FIG. 6, the apparatus 110 of the present invention is shown constructed in accordance with the preferred second embodiment. This second embodiment is substantially similar to the above-described first embodiment but for the following changes. Whereas the first embodiment uses a screw-type drive mechanism, comprising the internally-threaded receiver 20 and the externally-threaded drive rod 28, the second embodiment uses a ratchet-type drive mechanism broadly comprising an engagement component 120 and a toothed member 128.

The engagement component 120 may be substantially centered on an upper portion of the second coupling end 114 above the second channel 145 and between the first guide sleeve and the second guide sleeve 118. The engagement component 120 may include a lever or other actuator 150 to cause the engagement component 120 to, in a conventional ratcheting manner, engage the teeth of the toothed member 128 and advance the second coupling end 114 therealong. The toothed member 128 presents first and second ends 138,148, with the first end 138 being fixedly secured (as by, e.g., welding) to the first coupling end 112, an intermediate portion of the toothed member 128 passing engagingly through the engagement component 120, and the second end 148 being fixedly secured to the terminal guide plate 122. In all respects, the ratchet-type drive mechanism relies on conventional ratchet technology, the implementation of which is considered within the abilities of one with ordinary skill in the art.

In use and operation, the user actuates the lever or other actuator 150 associated with the engagement component 120 in order to move the second coupling end 114 along the toothed member 128 with a ratchet-like action, thereby moving the terminal track ends 11*a*,11*b* into position for connection.

Figure 7:
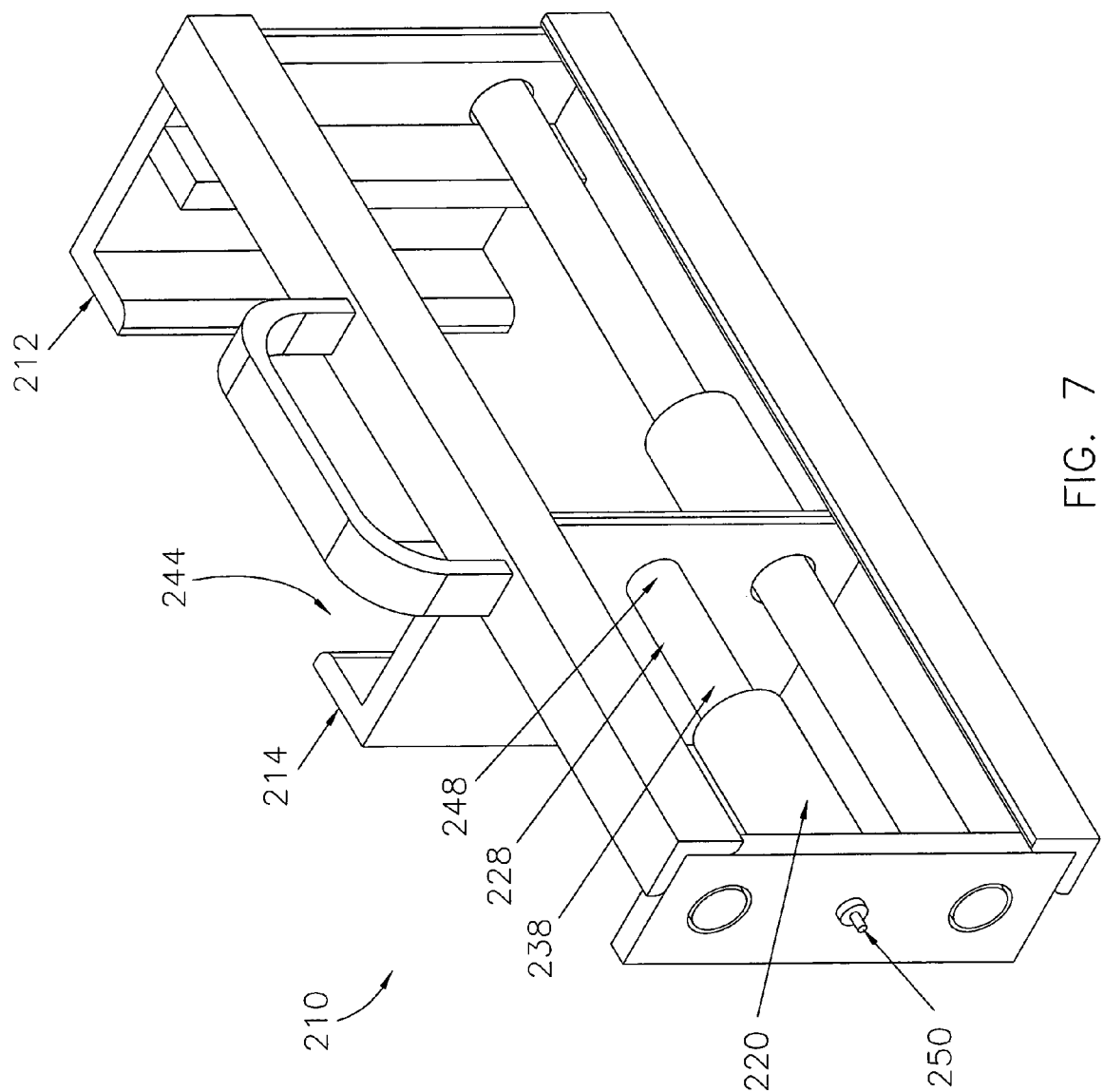
FIG. 7 is an isometric view of a preferred third embodiment of the device of the present invention using a hydraulic/pneumatic-type drive mechanism.

Referring also to FIG. 7, the apparatus 210 of the present invention is shown constructed in accordance with a preferred third embodiment. This third embodiment is substantially similar to the above-described first embodiment but for the following changes. Whereas the first embodiment uses a screw-type drive mechanism, comprising the internally-threaded receiver 20 and the externally-threaded drive rod 28, the third embodiment uses a hydraulic/pneumatic-type drive mechanism comprising a reservoir cylinder 220 and an extendable piston 228.

The reservoir cylinder 220 is substantially centered on the terminal guide plate 222 and fixedly secured thereto. The reservoir cylinder 220 contains a volume of hydraulic fluid or air for actuating the piston 228. The reservoir cylinder may present a fixture 250 to facilitate moving fluid or air into or out of the reservoir cylinder 220. Alternatively, the reservoir cylinder may be substantially sealed and present a handle or other actuator (not shown) whereby the fluid or air pressure within the cylinder 220 may be increased. The extendable piston 228 presents first and second ends 238, 248, with the first end 238 being movably received within the reservoir cylinder 220, and the second end 248 being fixedly secured to a backside of the engagement face 244 of the second coupling end 214. In all respects, the hydraulic/pneumatic-type drive mechanism relies on conventional hydraulic/pneumatic technology, the implementation of which is considered within the abilities of one with ordinary skill in the art.

In use and operation, the user introduces fluid or air via the fixture 250 or actuates the handle or other actuator to increase the fluid or air pressure within the cylinder 220, causing the piston 228 to extend and push the second coupling end 214 toward the first coupling end 212, thereby bringing the terminal track ends 11*a*,11*b* together for connection.

From the preceding description it will be appreciated that the device of the present invention provides a number of substantial advantages over the prior art, including, for example, advantageously allowing for quickly and efficiently drawing the terminal ends of the track together evenly and smoothly, thereby further facilitating connection. More specifically, in contrast to the prior art strap mechanism, the device of the present invention allows for achieving substantial mechanical assistance or enhancement to the user's own strength, thereby making it suitable for use with larger or heavier tracks; allows for a greater degree of control, which is particularly important to arriving at the closest alignment possible, thereby making the connection substantially easier; and can be positioned, engaged, and tightened more quickly and efficiently.

In contrast to the prior art track jack used by the military, the device of the present invention eliminates the impracticality of using two separate track jacks and substantially simultaneously tightening them; allows for drawing the terminal ends of the track together evenly and smoothly without one of the track jacks becoming disengaged during the process due to a lack of tension when the other track jack is tightened; allows for turning the threaded rod conveniently from either end of the device and from convenient angles other than 90°; and can be positioned, engaged, and tightened more quickly and efficiently.

Although the invention has been described with reference to the preferred embodiments illustrated in the drawings, it is noted that equivalents may be employed and substitutions made herein without departing from the scope of the invention as recited in the claims.

We claim:

1. A device for facilitating connection of first and second terminal ends of a vehicle track in order to form a closed loop of track, the device comprising:
    a first coupling end including
        a first engagement face including a first defined channel having three sides for receiving or otherwise engaging the first terminal end of the vehicle track, and
        a first through-hole;
    a second coupling end including
        a second engagement face including a second defined channel having three sides for receiving or otherwise engaging the second terminal end of the vehicle track, and
        an internally-threaded receiver; and
    an externally-threaded drive rod having first and second drive rod ends, with the first drive rod end extending freely through the first through-hole and terminating with a fitting, and the externally-threaded drive rod extending engagingly through the internally-threaded receiver,
    wherein turning the fitting causes the drive rod to turn, thereby drawing the first and second terminal ends of the vehicle track together to facilitate connection thereof to form the closed loop of track.

2. The device as set forth in claim 1, wherein the second coupling end further includes first and second guide sleeves, each being located at an opposite side of the internally-threaded receiver and oriented parallel to the internally-threaded receiver and to one another.

3. The device as set forth in claim 2, further including first and second guide rods, each having first and second guide rod ends, the first guide rod ends being secured to the first coupling end at opposite sides of the first through-hole, and the first and second guide rods passing slidably through the first and second guide sleeves.

4. The device as set forth in claim 3, further including a terminal guide plate including a second through-hole, the second guide rod ends being secured to the terminal guide plate at opposite sides of the second through-hole, and the second drive rod end extending freely through the second through-hole.

5. The device as set forth in claim 1, further including a terminal guide plate including a second through-hole, wherein the second drive rod end extends freely through the second through-hole.

6. The device as set forth in claim 5, further including a rail secured to and extending between the first coupling end and the terminal guide plate.

7. The device as set forth in claim 6, further including a handle secured to the rail to facilitate carrying the device.

8. A device for facilitating connection of first and second terminal ends of a vehicle track in order to form a closed loop of track, the device comprising:
    a first coupling end including
        a first engagement face for receiving or otherwise engaging the first terminal end of the vehicle track, and
        a first through-hole;
    a second coupling end including
        a second engagement face for receiving or otherwise engaging the second terminal end of the vehicle track, and
        an internally-threaded receiver,
    an externally-threaded drive rod having first and second drive rod ends, with the first drive rod end extending freely through the first through-hole and terminating with a fitting, and the externally-threaded drive rod extending engagingly through the internally-threaded receiver, wherein turning the fitting causes the drive rod to turn, thereby drawing the first and second terminal ends of the vehicle track together to facilitate connection thereof to form the closed loop of track;
    a terminal guide plate including a second through-hole, wherein the second drive rod end extends freely through the second through-hole;
    a rail secured to and extending between the first coupling end and the terminal guide plate; and
    a handle secured to the rail to facilitate carrying the device.

9. In a device for facilitating connection of first and second terminal ends of a vehicle track in order to form a closed loop of track, the device comprising first and second coupling ends and a mechanism for drawing the first and second coupling ends together, the improvement comprising:
    the first coupling end including
        a first engagement face including a first defined channel having three sides for receiving or otherwise engaging the first terminal end of the vehicle track, and
        a first through-hole;
    the second coupling end including
        a second engagement face including a second defined channel having three sides for receiving or otherwise engaging the second terminal end of the vehicle track, and
        an internally-threaded receiver; and
    the mechanism being an externally-threaded drive rod having first and second drive rod ends, with the first drive rod end extending freely through the first through-hole and terminating with a fitting, and the externally-threaded drive rod extending engagingly through the internally-threaded receiver,
    wherein turning the fitting causes the drive rod to turn, thereby drawing the first and second terminal ends of the vehicle track together to facilitate connection thereof to form the closed loop of track.

10. The device as set forth in claim 9, wherein the second coupling end further includes first and second guide sleeves, each being located at an opposite side of the internally-threaded receiver and oriented parallel to the internally-threaded receiver and to one another.

11. The device as set forth in claim 10, further including first and second guide rods, each having first and second guide rod ends, the first guide rod ends being secured to the first coupling end at opposite sides of the first through-hole, and the first and second guide rods passing slidably through the first and second guide sleeves.

12. The device as set forth in claim 11, further including a terminal guide plate including a second through-hole, the second guide rod ends being secured to the terminal guide plate at opposite sides of the second through-hole, and the second drive rod end extending freely through the second through-hole.

13. The device as set forth in claim 9, further including a terminal guide plate including a second through-hole, wherein the second drive rod end extends freely through the second through-hole.

14. The device as set forth in claim 13, further including a rail secured to and extending between the first coupling end and the terminal guide plate.

15. The device as set forth in claim 14, further including a handle secured to the rail to facilitate carrying the device.

16. A device for facilitating connection of first and second terminal ends of a vehicle track in order to form a closed loop of track, the device comprising:
   a first coupling end including
      a first engagement face including a first defined channel which is U-shaped for receiving or otherwise engaging the first terminal end of the vehicle track, and
      a first through-hole;
   a second coupling end including
      a second engagement face including a second defined channel which is U-shaped for receiving or otherwise engaging the second terminal end of the vehicle track, and
      an internally-threaded receiver, and
   an externally-threaded drive rod having first and second drive rod ends, with the first drive rod end extending freely through the first through-hole and terminating with a fitting, and the externally-threaded drive rod extending engagingly through the internally-threaded receiver, wherein turning the fitting causes the drive rod to turn, thereby drawing the first and second terminal ends of the vehicle track together to facilitate connection thereof to form the closed loop of track.

17. In a device for facilitating connection of first and second terminal ends of a vehicle track in order to form a closed loop of track, the device comprising first and second coupling ends and a mechanism for drawing the first and second coupling ends together, the improvement comprising:
   the first coupling end including
      a first engagement face including a first defined channel which is U-shaped for receiving or otherwise engaging the first terminal end of the vehicle track, and
      a first through-hole;
   the second coupling end including
      a second engagement face including a second defined channel which is U-shaped for receiving or otherwise engaging the second terminal end of the vehicle track, and
      an internally-threaded receiver; and
   the mechanism being an externally-threaded drive rod having first and second drive rod ends, with the first drive rod end extending freely through the first through-hole and terminating with a fitting, and the externally-threaded drive rod extending engagingly through the internally-threaded receiver, wherein turning the fitting causes the drive rod to turn, thereby drawing the first and second terminal ends of the vehicle track together to facilitate connection thereof to form the closed loop of track.

* * * * *